(12) United States Patent
Hao et al.

(10) Patent No.: US 8,972,308 B2
(45) Date of Patent: Mar. 3, 2015

(54) COMBINING MULTIVARIATE TIME-SERIES PREDICTION WITH MOTIF DISCOVERY

(75) Inventors: Ming C Hao, Palo Alto, CA (US); Umeshwar Dayal, Saratoga, CA (US); Manish Marwah, Palo Alto, CA (US); Daniel Keim, Steiβlingen (DE); Halldor Janetzko, Baden-Wittenberg (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 389 days.

(21) Appl. No.: 13/284,990

(22) Filed: Oct. 31, 2011

(65) Prior Publication Data

US 2013/0110753 A1　May 2, 2013

(51) Int. Cl.
　　*G06F 15/18*　　(2006.01)
　　*G06F 17/00*　　(2006.01)
　　*G06N 5/02*　　(2006.01)
　　*G06K 9/00*　　(2006.01)

(52) U.S. Cl.
　　CPC　*G06F 17/00* (2013.01); *G06N 5/02* (2013.01); *G06K 9/0055* (2013.01)
　　USPC .......................................................... 706/12

(58) Field of Classification Search
　　USPC .......................................................... 706/12
　　See application file for complete search history.

(56) References Cited

U.S. PATENT DOCUMENTS 6,405,672 B1 *　6/2002　De Mol et al. ............. 119/14.15
2002/0091972 A1 *　7/2002　Harris et al. ................... 714/47

OTHER PUBLICATIONS

C. Chiu et al., "Probabilistic Discovery of Time Series Motifs", ACM SIGKDD '03, Aug. 2003, pp. 1-10.*
J. De Gooijer and R. Hyndman, "25 years of time series forecasting", Int'l J. of Forecasting, vol. 22, 2006, pp. 443-473.*
F. Duchene et al., "Learning recurrent behaviors from heterogeneous multivariate time-series", Art. Intelligence in Medicine, vol. 39, 2007, pp. 25-47.*
P Geurts, "Pattern Extraction for Time Series Classification", PKDD 2001, pp. 115-127.*
T.H. Moon and S.Y. Sohn, "Intelligent approach for effective management of governmental funds for small and medium enterprises", Expert Systems with Applications, vol. 29, Is. 3, Oct. 2005, pp. 566-572.*
Agrawal, R., "Fast Algorithms for Mining Association Rules," Proceedings of the 20th International Conference on Very Large Data Bases (VLDB), Sep. 12-15, 1994; 32 pp.
Buono, P., "Interactive Pattern Search in Time Series," Proceedings of Conference on Visualization and Data Analysis, VDA 2005, SPIE vol. 5669, Jan. 17, 2005; pp. 175-186.

(Continued)

*Primary Examiner* — Kakali Chaki
*Assistant Examiner* — Vincent Gonzales
(74) *Attorney, Agent, or Firm* — Michael A. Dryja (57) ABSTRACT

Multivariate time-series prediction is combined with motif discovery. Multivariate time-series prediction is performed on measured (past) data points to generate or determine predicted data points. One or more motifs are discovered or determined within the combined measured data points and the predicted data points. The motifs within the measured data points are associated with the motifs within the predicted data points to permit inferences of the motifs within the measured data points to be applied to the motifs within the predicted data points. The measured data points, the predicted data points, and the motifs are displayed. User interaction with this display of the measured data points, the predicted data points, and the motifs is permitted.

15 Claims, 5 Drawing Sheets

(56) References Cited

OTHER PUBLICATIONS

Bash, C., "Dynamic Thermal Management of Air Cooled Data Centers", IEEE Conference on Thermal and Thermomechanical Phenomena in Electronics Systems, San Diego, CA, May 30, 2006; pp. 445-452.

Chiu, B., "Probabilistic discovery of time series motifs," Proceedings of the ninth ACM SIGKDD International Conference on Knowledge Discovery and Data Mining, Aug. 24-27, 2003, Washington, DC; pp. 493-498.

Chen, L., "Symbolic Representation and Retrieval of Moving Object Trajectories," MIR'04, Oct. 15-16, 2004; pp. 227-234.

Hao, M., "Multi-Resolution Techniques for Visual Exploration of Large Time-Series Data," Proceedings: IEEE VGTC Symposium on Visualization, 2007; pp. 1-8.

Lin, J., "Finding motifs in time series," In Proceedings of the Second Workshop on Temporal Data Mining, SIGKDD '02, Jul. 23-26, 2002; 11 pp.

Lin, J., "Experiencing SAX: a Novel Symbolic Representation of Time Series," Data Min Knowl Disc, Oct. 2007, vol. 15; pp. 107-144.

Patel, P., "Mining motifs in massive time series database," Proceedings of the 2002 IEEE International Conference on Data Mining, Dec. 9-12, 2002; pp. 370-377.

Lin, J., "VizTree: a Tool for Visually Mining and Monitoring Massive Time Series Database," Proceedings of the 30th VLDB Conference, Canada, Aug. 29-Sep. 3, 2004; pp. 1269-1272.

McLachlan, P., "LivePRAC: Interactive Visual Exploration of System Management Time-Series Data," CHI 2008 Proceeding/Visualizations, Florence, Italy, Apr. 5-10, 2008; pp. 1483-1492.

Ordonez, P., "Visualizing Multivariate Time Series data to Detect Specific Medical Conditions," AMIA Annual Symposium Proceedings. 2008; pp. 530-534.

Patnaik, D., "Sustainable Operation and Management of Data Center Chillers using Temporal Data Mining," In the Proceedings of KDD'09, Paris, France, Jun. 28-Jul. 1, 2009; pp. 1305-1313.

Holt, C., "Forecasting seasonal and trends by exponentially weighted moving averages," International Journal on Forecasting 20 (2004); pp. 5-10.

Goodwin, P., "The Holt-Winters Approach to Exponential Smoothing: 50 Years Old and Going Strong," Foresight, Fall 2010; pp. 30-33.

Douglas, D., "Algorithms for the reduction of the number of data points required to represent a digitized line or its caricature", The Canadian Cartographer 10(2), 112-122 (1973).

Sharma, R., "On Building Next Generation Data Centers: Energy Flow in the Information Technology Stack," ACM, Proceedings of the 1st Bangalore Annual Compute Conference, Compute 2008, Jan. 18-20, 2008; 6 pp.

Taylor, J., "Forecasting Daily Supermarket Sales Using Exponentially Weighted Quantile Regression," European Journal of Operational Research 178, Apr. 1, 2007; pp. 154-167.

Ichikawa, Y., "A Visualization Environment for Multiple Daytime Stock Price Predictions," Proceedings of the 2nd VIIP International Conferences on Visualization, Imaging and Image Processing, Malaga, Spain, Sep. 9-12, 2002; 7 pp.

Winters, P., "Forecasting sales by exponentially weighted moving averages," Management Science, vol. 6, No. 3, Apr. 1960; pp. 324-342.

Petrecca, G., Principles and Applications of Industrial Energy Managment, Chapter 12: Facilities—Industrial Cooling Systems, Springer Science + Business Media, New York, 1993.

Alonso, A., "Time Series Analysis: Forecasting with ARIMA Models.," University of Madrid, Jun. 2012; 66 pp.

Wolfers, J., "Prediction Markets," Journal of Economic Perspectives, vol. 18, No. 2, Spring 2004; pp. 107-126.

Annex B: "The Holt-Winters Forecasting Method," 2010. Online at <http://www.ons.gov.uk/ons/guide-method/method-quality/specific/economy/index-of-services/index.html>.

* cited by examiner

COMBINING MULTIVARIATE TIME-SERIES PREDICTION WITH MOTIF DISCOVERY

BACKGROUND

Large amounts of data are frequently collected in many diverse real-world settings. As examples, chiller data may be collected within data centers; drilling data may be collected for gas wells; and resource utilization data may be collected within large-scale computing systems. Once the data has been collected, users often analyze the data to ensure that the underlying systems are performing correctly, among other things.

DETAILED DESCRIPTION

As noted in the background section, large amounts of data are frequently collected in many different types of real-world settings, for subsequent analysis. One type of analysis is to identify frequently occurring patterns within the data, which can be used, for instance, to verify that the underlying systems are performing correctly, as well as to identify problems that the systems may be experiencing, among other things, based on the prediction of the events corresponding to these patterns occurring in the future. Such frequently occurring patterns within the data are referred to as motifs.

Disclosed herein are techniques for discovering such motifs, as well as for visualizing the motifs within data points to convey this information to a user in an easily understood manner. Multivariate time-series prediction is performed on measured data points (i.e., data regarding occurrences in the past) to generate predicted data points (i.e., data regarding predicted occurrences in the future). One or more motifs are discovered within the measured data points and the predicted data points. Each motif corresponds to a frequently occurring pattern within the measured data points or the predicted data points. The measured data points, the predicted data points, and the motifs are displayed on a display device.

More specifically, disclosed herein are techniques that combine multivariate time-series prediction with motif pattern discovery. Pattern-preserving prediction and time-distance optimization approaches are employed to generate predicted data points within a multivariate data stream. Motif discovery approaches are then employed to locate frequently occurring actual and predicted patterns having starting time and ending durations. The patterns, or motifs, that have occurred within the actual data points are associated with an efficiency, or more generally a performance, matrix (or characteristic) for motif efficiency analysis. Further, motifs within the predicted data points are associated with the motifs discovered within the measured data points to permit properties and contextual inferences of the past motifs to be applied to the discovered motifs within the predicted data points.

Figure 1:
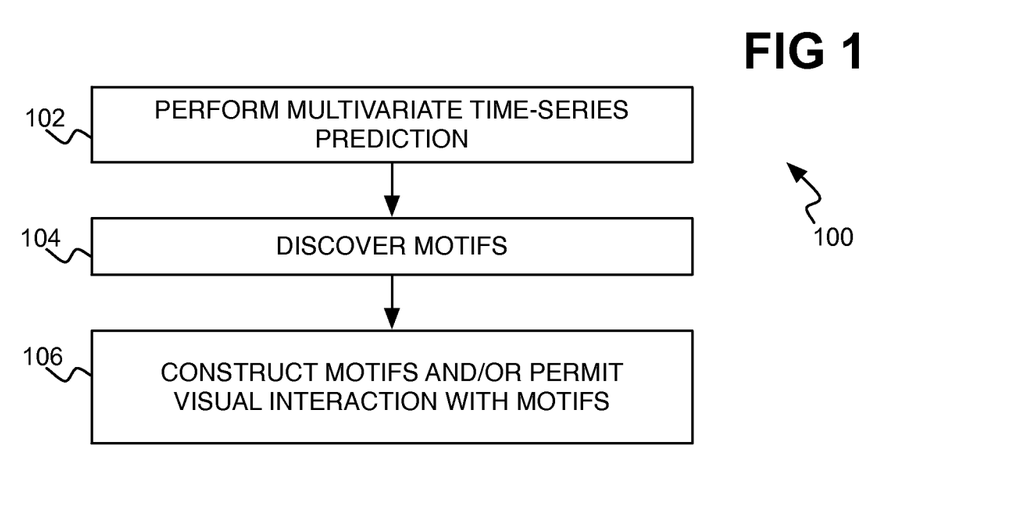
FIG. 1 is a flowchart of an example method for performing multivariate time-series prediction, motif discovery, and data points and motif display.

FIG. 1 shows an example method 100. The method 100, as well as other methods disclosed herein, may be performed by a processor of a computing device, like a computer. The method 100, as well as other methods disclosed herein, may be implemented as one or more computer programs stored on a non-transitory computer-readable data storage medium, which are executed by the processor. The computer-readable data storage medium may be a volatile medium like a random-access memory, and/or a non-volatile medium like a hard disk drive or a solid state drive.

The method 100 performs multivariate time-series prediction on measured (i.e., past) data points to generate predicted data points (102). The measured data points can be data that has been acquired by measurements performed in relation to a real-world setting. For example, chiller data in the context of a data center can include the temperature of air output by the chillers, the energy being consumed by the chillers, and so on. The predicted data points are a predicted extension of what the measured data points will be in the future, assuming existing trends within the measured data points continue into the future.

In general, multivariate analysis is the analysis of more than one statistical variable at a given time. For instance, linear regression and correlation are bivariate analysis techniques that involve two statistical variables. Multivariate time-series analysis is multivariate analysis that is conducted for a series of time, such as that over which data has been measured in relation to a real-world setting. Multivariate time-series prediction is therefore in general multivariate analysis that is conducted for a series of time in order to predict how the data in question will vary in the future. An example method for performing multivariate time-series prediction on measured data points is described later in the detailed description.

The method 100 discovers, or determines, one or more motifs within the measured (i.e., past) data points and the predicted data points (104). As noted above, a motif is or corresponds to a frequently occurring pattern within the measured data points or the predicted data points. The motifs may be of particular interest both within the measured data points and the predicted data points. The motifs can correspond to events that have occurred or that are predicted to occur within the real-world setting in relation to which the measured data points have been collected. Some of these events may themselves reflect underlying problems within the real-world setting that should receive attention to rectify the problems. For these and other reasons, motif identification is useful. An example method for discovering or determining motifs is described later in the detailed description.

The method 100 can then be said to construct the motifs and permit visual interaction with the motifs (106). The construction of the motifs in this context means that the motifs can be laid out in a hierarchical structure, and that the motifs are translated back to the original time series encompassing the measured (i.e., past) and predicted data points, as is described in more detail later in the detailed description. Visual interaction with the motifs can include displaying the measured (i.e., past) data points, the predicted data points, and the motifs on a display device. This display can be achieved in a way to highlight the motifs within the measured and predicted data points, such as in accordance with performance characteristics to which the motifs correspond. For example, in relation to chiller data of a data center, the performance characteristics may relate to efficiencies of the chiller equipment, such that low efficiencies can denote potential problems within the equipment. A user may be permitted to select a motif within the predicted data points to link to the corresponding motifs within the measured (i.e., past) data points. An example method for displaying the measured and the predicted data points, and the motifs, is described later in the detailed description.

Figure 2:
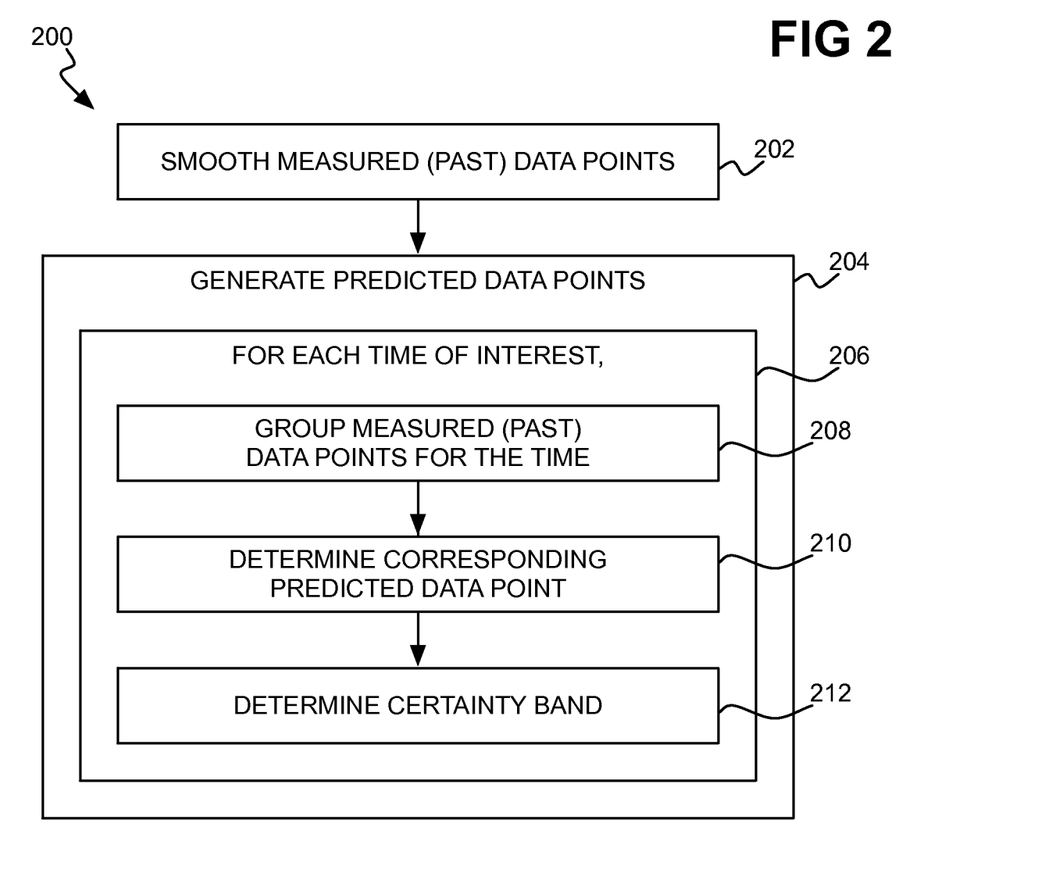
FIG. 2 is a flowchart of an example method for performing multivariate time-series prediction.

FIG. 2 shows an example method 200 for performing multivariate time-series prediction on measured (i.e., past) data points to generate predicted data points. As such, the method 200 can be performed to implement part 102 of the method 100. The method 200 can smooth the measured (i.e., past) data points (202). Smoothing the measured data points is useful, because multivariate time series, such as those in many types of measured data points, are commonly very noisy, and the smoothing helps reduce the negative effects of the noise on the generation of the predicted data points.

Such smoothing can be based on moving averages within the measured data points, and using a varying time interval, to generate smoothed measured data points. Furthermore, smoothing the measured data points can include reducing the measured data points to a number of significant measured data points (as defined by the user). Maintaining the significant data points within the measured data points ensures that significant data points, such as peaks and troughs within the measured data points, are not lost during smoothing. Such significant data points can be specifically relevant when generating the predicted data points, and when identifying motifs. As such, the significant data points may be measured data points that are greater than or less than a median or mean of the measured data points by more than a threshold.

More specifically, the smoothing can be achieved as follows. A connecting line is created between the first measured data point and the last measured data point. A highest or lowest measured data point between these two data points is located. If the absolute height of the located data point is greater than a threshold, then the data point is tagged as a significant data point. This process is recursively repeated until no more significant data points are located. The resulting smoothed line is the collection of the first and last measured data points, and the significant measured data points, with line segments connecting adjacent such data points.

It is noted that each such significant measured data point can be said to have a corresponding weight associated with the recursion level at which it was located. For instance, the first significant data point located has a highest weight, because it was discovered first, in the first recursive iteration of the process. The last significant data point located has a lowest weight by comparison, because it was discovered last, in the last recursive iteration of the process.

After the measured data points have been smoothed, the predicted data points are generated from the (smoothed) measured (i.e., past) data points (204). Such predicted data point generation can be achieved as follows for each time of interest (206). For example, the times of interest may correspond to the sixty minutes between midnight and 1 AM, such that there are sixty times of interest. However, more generally, the times of interest can extend for greater or lesser durations, at greater or lesser granularity. Another example of times of interest may correspond to a twelve-hour period, at fifteen-minute increments.

The (smoothed) measured (i.e., past) data points are grouped for the current time of interest in relation to which part 206 is being performed (208). For example, assume that the current time of interest is midnight. Therefore, the (smoothed) measured data points that correspond to midnight are grouped together. If the (smoothed) measured data points includes data for fifteen days, for instance, then there will be up to fifteen such data points, one data point for midnight at each day.

A corresponding predicted data point is determined based on these (smoothed) measured (i.e., past) data points that have been grouped (210). For example, if the current time of interest is midnight, then the predicted data point for midnight is determined based on the (smoothed) measured data points that also correspond to midnight, which are those data points within the group that was assembled in part 208. In general, the corresponding predicted data point is determined, or generated, based on a summation of the (smoothed) measured data points within the group assembled in part 208, where each such data point is weighted.

The weight assigned to each (smoothed) measured data point within the group for the purpose of this summation can be a combination of two measures, time distance and significant data point importance. The time distance ensures that more recent measurements have a higher influence than less recent measurements. The time distance is determined as the linear distance between the time of the predicted data point being determined, and the time of the (smoothed) measured data point in question. Significant data point importance ensures that more significant (smoothed) measured data points are weighted more heavily. Significant data point importance is determined using a recursion depth of the smoothing approach that has been described above. Significant data points that are located in earlier recursive iterations are assigned higher weights than significant data points that are located in later recursive iterations.

As one example, the weight assigned to each (smoothed) measured data point within the group may be or may be proportional to $1/tr$, where $t$ is the distance in time between the data point in question and the time of the predicted data point being determined, and $r$ is the recursion depth at which the data point was located during smoothing. The greater $t$ is, then, the lesser the weight, and likewise the greater $r$ is, the lesser the weight. That is, the farther away time-wise a given data point is from the time of the predicted data point, and the greater the recursion depth, the less weight this data point is assigned in affecting the predicted data point. The weights may be normalized to ensure that the summation resulting in the predicted data point is on a scale common to that of the (smoothed) measured data points themselves.

A certainty band may be determined for the predicted data point that has been generated (212). The certainty band reflects an upper and lower confidence thresholds as to the range in which the data point is predicted to actually occur. For instance, the predicted data point may have a value of X. However, with a specified confidence, the predicted data point may more generally be expected to fall within a range of Y through Z, where X is between Y and Z. Therefore, the certainty band provides this range, so that a user can know the likelihood that the data point will indeed be X.

Different statistical techniques may be employed to determine the certainty band. In general, these techniques weigh the variation in corresponding measured data points. For example, if at 2 PM every day for the past five years the measured data points have a value of X, then the likelihood that this value of X will be seen at 2 PM in the future is quite high, such that there is a narrow certainty band. By comparison, if the measured data points are wildly divergent in value at 2 PM every day for the past five years, then the likelihood that X will be seen at 2 PM in the future is much lower, and as such there is a wider certainty band.

Therefore, the result of the multivariate time-series prediction of the method 200 includes predicted data points, generated from measured data points that may be smoothed. The prediction of the method 200 may also include for each predicted data point a certainty band denoting the certainty with which the predicted data point is likely to occur. The certainty band may be expressed as a range of values that a predicted data point is likely to be with a specified confidence.

Figure 3:
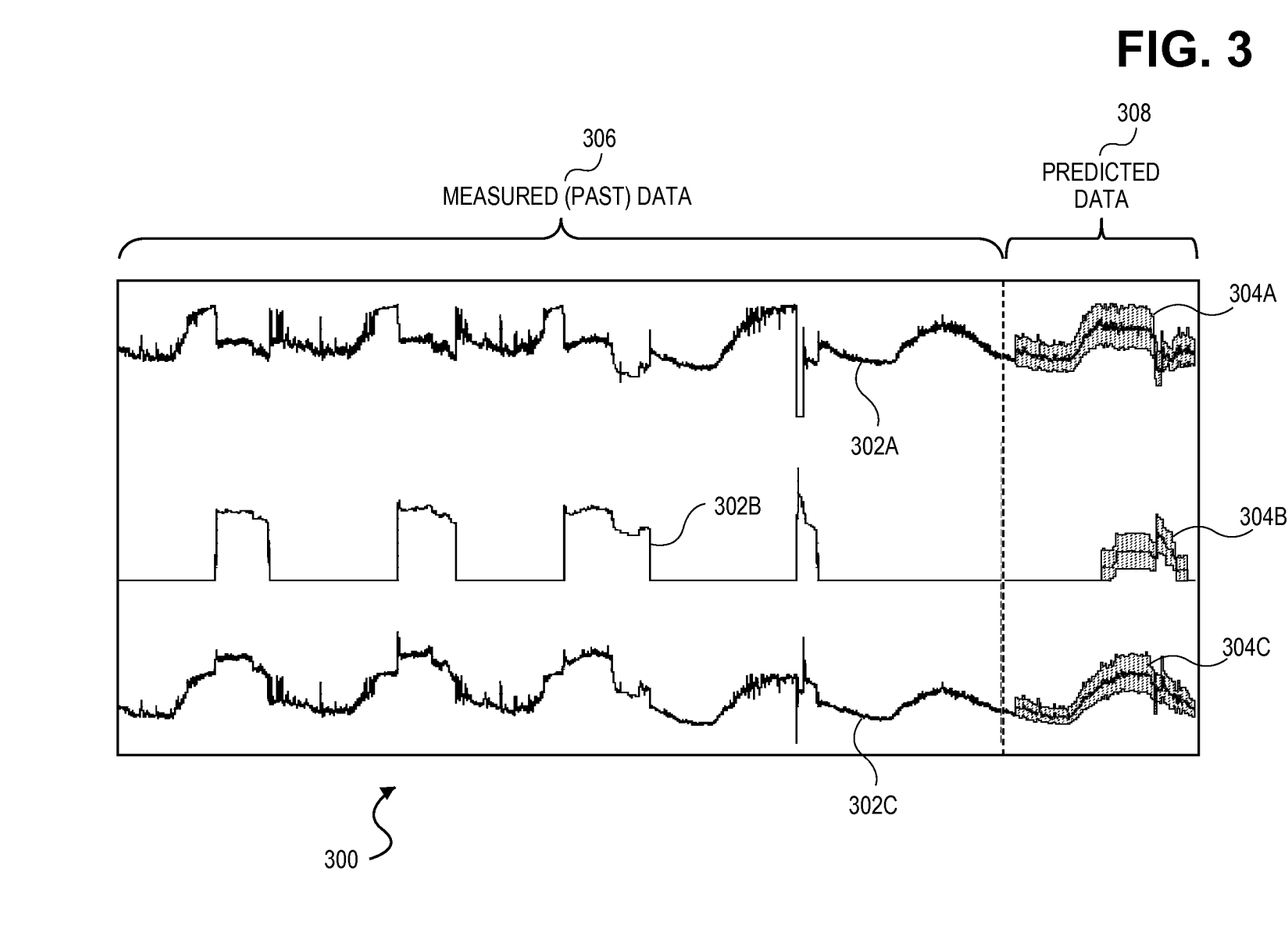
FIG. 3 is a diagram of an example plot depicting example performance of the method of FIG. 2.

FIG. 3 graphically depicts example performance of the method 200. An example plot 300 includes three data sets 302A, 302B, and 302C, which are collectively referred to as the data sets 302. Each data set 302 includes measured data 306 and predicted data 308. The measured data 306 is past data in that it has already occurred, whereas the predicted data 308 is future data in that it has not yet occurred (and may not occur, but is predicted to occur). The data sets 302 themselves are the end results after the smoothing of FIG. 2 has been performed (with respect to the measured data 306), and after both the smoothing and the prediction of FIG. 2 has been performed (with respect to the predicted data 308). Furthermore, the data sets 302 have corresponding certainty bands 304A, 304B, and 304C, which are collectively referred to as the certainty bands 304. The certainty bands 304 indicate confidence of the predicted data 308 of the data sets 302 on a data point-by-data point basis.

Figure 4:
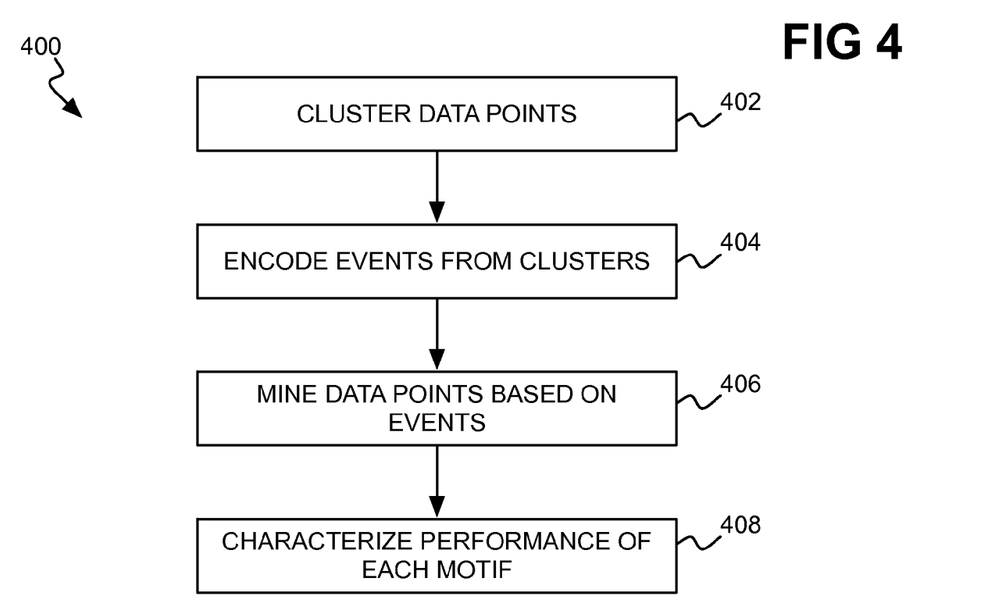
FIG. 4 is a flowchart of an example method for performing motif discovery.

FIG. 4 shows an example method 400 for discovering or determining motifs within the measured data points and the predicted data points. The measured (i.e., past) data points and the predicted data points are clustered into clusters (402). More specifically, the (smoothed) measured data points and the predicted data points together form a multivariate time series. Clustering is performed on this time series, where each data point is considered as a vector. As one example, a k-means clustering technique can be employed to cluster the data points into k clusters.

As a result of the clustering, each cluster has a label, or symbol. As such, the multivariate time series is encoded as a single one-dimensional sequence of labels or symbols. Clustering thus effectively strips off the temporal information of the multivariate time series, clusters the data points into clusters to obtain cluster labels or symbols, and then adds this temporal information back to the time series by virtue of these labels or symbols. That is, the original temporal information within the multivariate time series is replaced with the cluster labels or symbols.

Events are encoded from the clusters (404). An event is a transition in the cluster label or symbol within the multivariate time series. Therefore, in the sequence of cluster labels or symbols, change points at which clusters labels or symbols change are detected, in the original order of the multivariate time series. Each such change point is an event. The result of the event encoding in part 404 is thus a sequence of the events in accordance with the order of the multivariate time series.

The measured and predicted data points are mined based on the events encoded from the clusters to discover the motifs (406). More specifically, the sequence of the events is mined to determine or locate the motifs within the measured and predicted data points. A serial episode is defined as an ordered (sub-)sequence of consecutive events within the overall sequence of events. Such serial episodes are located within the sequence, and episodes that occur more than a threshold number of times are defined as motifs. The occurrences of the episodes may be specified as having to be non-overlapping occurrences in one implementation. The motif discovery approach can be performed iteratively, where at first large (i.e., long) episodes are discovered, and then small (i.e., short) episodes are discovered.

For example, a length may be set high at first (i.e., to a predetermined large value), and serial episodes having this length and that occur more than the threshold number of times located and defined as motifs. The length is then decremented, and serial episodes having this length and that occur more than the threshold number of times located and defined as motifs as well. This process is repeated until the length has been decremented to a predetermined small value, and motifs of this small length have been discovered.

The end result of part 406 is the identification of one or more motifs. Each motif has a duration. As to the multivariate time series including the (smoothed) measured data points and the predicted data points, each motif has a number of instances within this time series, at differing start and end times. However, the end time minus the start time of each instance of a particular motif is identical, since the instances of the same motif have the same duration.

The motifs may each have its performance characterized (408). Characterizing the performance of a motif associates the motif with a performance characteristic that is measurable on a common scale. Characterizing the performance of each motif in this respect helps an objective assessment as to whether each motif is "good" or "bad" in terms of performance. Some motifs may indicate optimal or "good" performance, whereas other motifs may indicate sub-optimal or "bad" performance.

For example, chiller data in the context of a data center can include the efficiency of each of a number of chillers. A motif in relation to such chiller data may reflect the efficiency of a chiller for a period of time (i.e., a time duration). The efficiency of the chiller is the performance of the motif in this respect, and thus reflects a performance characteristic (e.g., efficiency) that is measurable on a common scale. The common scale in this example may be from zero percent efficiency to one hundred percent efficiency, in intervals of five percent. Therefore, characterizing the performance of the motif associates the motif with a value within the set {5%, 10%, . . . , 100%}.

Figure 5:
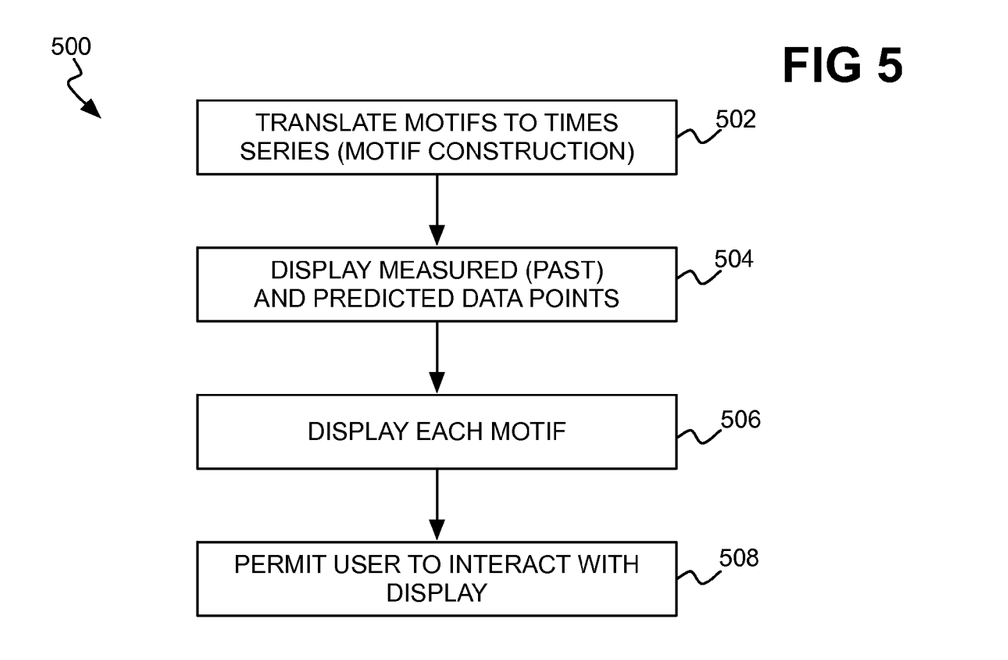
FIG. 5 is a flowchart of an example method for displaying measured data points, predicted data points, and motifs within these data points.

FIG. 5 shows an example method 500 for displaying the measured and predicted data points, and the motifs within the measured and predicted data points. That is, the method 500 is for performing motif construction and motif pattern visual interaction. The motifs are translated to times series encompassing the measured (i.e., past) and predicted data points (502), which is said to be the motif construction process, or a part of this process. For instance, the motifs each have a time duration, and a start time. Within the time series that encompasses the measured and predicted data points, the motifs are translated to this time series, such that they occur at appropriate times, and for appropriate durations, within the time series.

For example, the time series encompassing the measured data points may be from time t1 to time t2, and the time series encompassing the predicted data points may be from time t2 to time t3. As such, the time series encompassing both the measured and predicted data points is from time t1 to time t3. As a concrete example, time t1 may be 9 AM on September 5, say, and time t2 may be 8 PM on September 7. A motif to be translated onto this time series may have a start time of 1 PM and a duration of fifteen minutes. Therefore, in the concrete example, the motif is translated onto the time series three times, at 1 PM on September 5, at 1 PM on September 6, and at 1 PM on September 7, for fifteen minutes at each time.

The measured (i.e., past) and predicted data points are displayed over the times series (504). For instance, a graph may be displayed, where the x-axis of the graph denotes time, and the y-axis of the graph denotes the values of the measured and predicted data points. In the concrete example of the previous paragraph, the x-axis thus starts at 9 AM on September 5, and extends to 8 PM on September 7. The measured data points and the predicted data points are plotted on this graph.

With respect to the predicted data points, the certainty bands for the predicted data points may be displayed via lightly shaded lines or bars extending upwards and downwards from the data points. These lines or bars indicate the range within which the data point is likely to occur with a specified confidence. For example, for a predicted data point that has a value of X, the line or bar may extend from X upwards to a value of Z at the upper bound of the certainty band for the data point, and downwards to a value of Y at the lower bound of this certainty band, where X is between Y and Z.

Each motif is displayed on the measured (i.e., past) and predicted data points over the time series as well (506). Each motif may be displayed in a manner correspondence to its performance characteristic on the common scale. For instance, the motifs may be displayed by shading blocks over the y-axis at locations along the x-axis corresponding to the locations of the motifs on the time series. The degree and/or color of the shading may correspond to the performance characteristics of the motifs.

For example, chiller data in the context of a data center may have corresponding motifs that reflect the efficiency of a chiller for a period of time. A low efficiency chiller may be one having an efficiency of less than L %, whereas a high efficiency chiller may be one having an efficiency of greater than H %, where H is greater than L. A chiller having an efficiency that is neither low nor high may be a chiller having an efficiency between L % and H %.

Two examples are described as to how such motifs may be displayed on the measured and predicted data points over the time series. First, motifs corresponding to periods of low efficiency may be displayed in red; motifs corresponding to periods of high efficiency may be displayed in blue; and motifs corresponding periods of neither high nor low efficiency may be displayed in green. As such, a user viewing the motifs can easily discern the events of concern, corresponding to periods of time in which chiller efficiency is low.

Second, motifs can be displayed so that the extent to which they are shaded correspond to their efficiencies, and a color changeover occurs at some point M % between L % and H %. For instance, motifs corresponding to periods where the efficiencies are less than M % are displayed in red, at greater shades of red based on how much less than M % the efficiencies are. This increase in shading may be non-linear, such that shading occurs at an even greater rate for efficiencies less than L %. Motifs corresponding to periods where the efficiencies are greater than M % are displayed in blue, at greater shades of blue based on how much greater the efficiencies than M % the efficiencies are. This increase in shading may also be non-linear, such that shading occurs at an even greater rate for efficiencies greater than H %.

In one implementation, the height of each motif along the y-axis is inversely proportional to the duration of the motif along the x-axis. Therefore, longer or larger motifs have smaller heights than shorter or smaller motifs have. This permits overlapping motifs to nevertheless be visible. For instance, a shorter-in-duration motif that is completely overlapped by a longer-in-duration motif is nevertheless visible, because its height is larger along the y-axis.

A user may be permitted to interact with the display of the measured (i.e., past) and predicted data points and of the motifs (508). For instance, a graphical user interface may permit the user to navigate a display of a relatively long time series, where just a portion of the time series can be displayed at any given time. The graphical user interface may permit a user to zoom into a portion of the time series to examine a particular portion of interest, then zoom back out to view more of the time series, and so on. The graphical user interface may further permit a user to select a motif to obtain further information regarding the selected motif.

Figure 6:
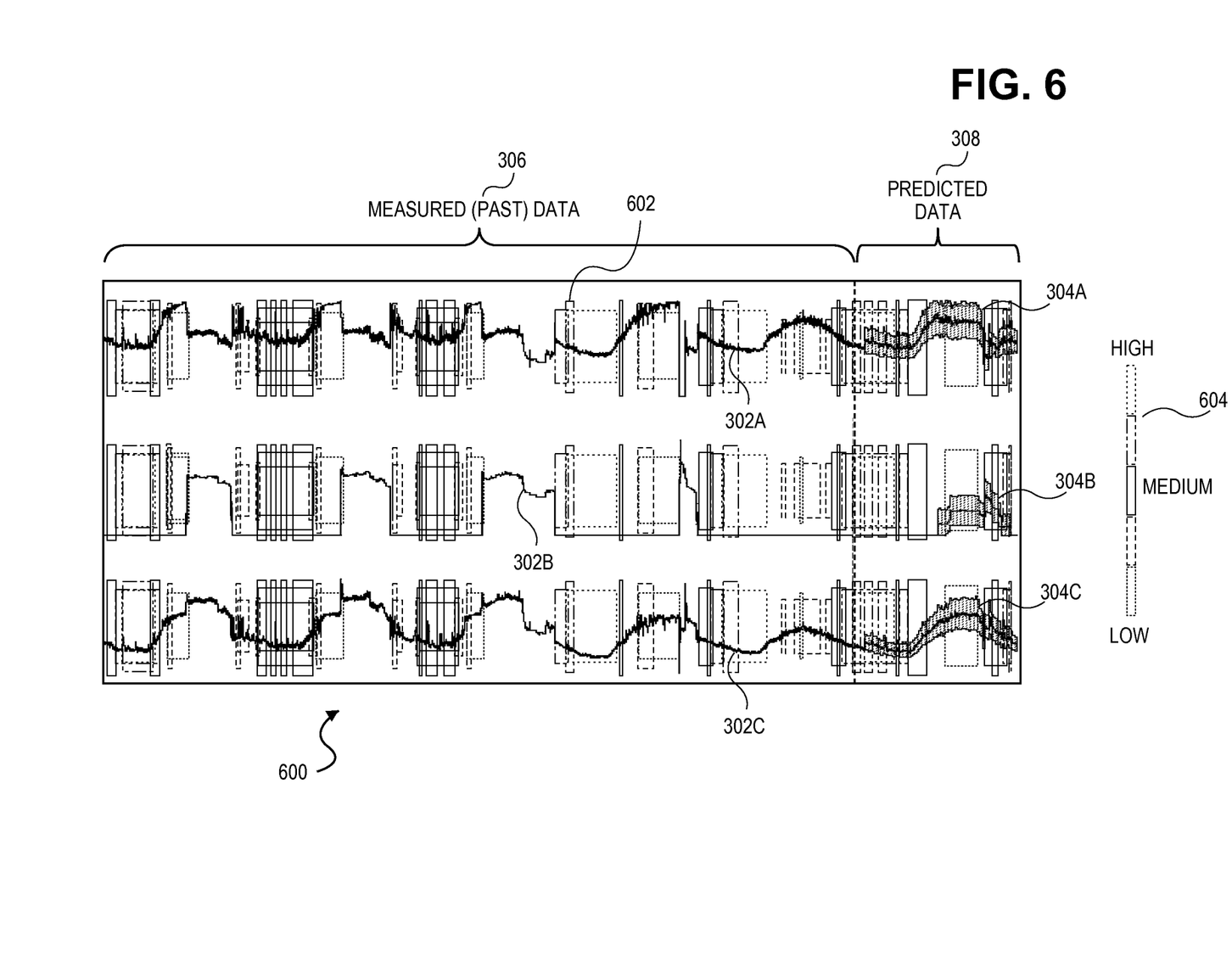
FIG. 6 is a diagram of an example plot depicting example performance of the method of FIG. 5.

FIG. 6 graphically depicts example performance of the method 500. The example plot 600 is the same as the plot 300 of FIG. 3, but with the addition of motifs, such as the example motif 602 that is explicitly called out in FIG. 6. As such, the example plot 600 includes data sets 302 that each include measured data 306 and predicted data 308, as well as certainty bands 304 for the predicted data 308.

The motifs displayed in the example plot 600, such as the motif 602, have widths corresponding to their durations, and heights that are inversely proportional to their durations, as noted above. The motifs further are displayed with shading in correspondence with their performance characteristics. A legend 604 indicates such performance from low, to medium, to high. Therefore, a user is also easily able to discern motifs of interest, by locating those motifs that have the appropriate shading in question.

As an example of a specific implementation of part 408 of the method 400 in particular, characterizing the performance of each motif can include classifying the performance of each motif, such as classifying the efficiency of each motif as high, low, and so on. As such, displaying each motif in part 506 of the method 500 can include displaying different efficiency or performance levels in different manners, such as in different colors, to provide user assistance in determining whether the motifs of the predicted data points are of high or low performance. Therefore, a user is able to determine that a discovered motif in the predicted data points is of low efficiency, for example, and able to appropriately reconfigure the system in question to prevent such predicted low efficiency from occurring. For instance, the system may be reconfigured, manually and/or automatically, so that such motifs instead become high efficiency motifs when they actually occur.

Figure 7:
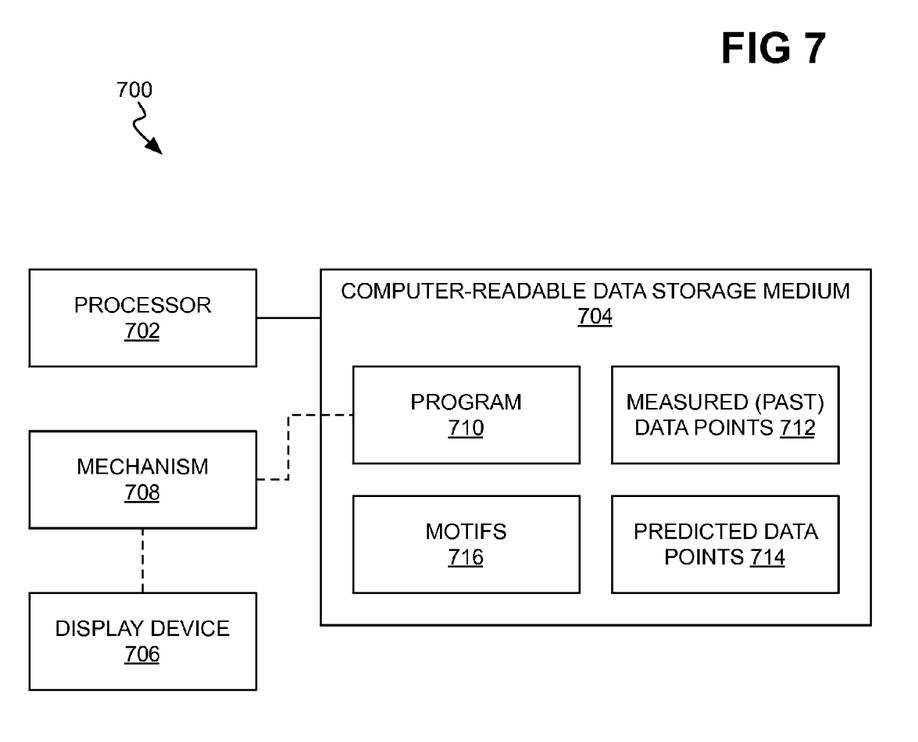
FIG. 7 is a diagram of an example system for performing multivariate time-series prediction, motif discovery, and data points and motif display.

FIG. 7 shows an example system 700. The system 700 may be implemented as one or more computing devices. The system 700 includes a processor 702, a non-volatile computer-readable data storage medium 704, a display device 706, and a mechanism 708. The system 700 can and typically does include other components, in addition to those depicted in FIG. 7, such as input devices, network adapters, and so on.

The display device 706 may be a flat panel display device, such as a liquid crystal (LCD), a cathode-ray tube (CRT) display device, or another type of display device. The computer-readable data storage medium 704 stores one or more computer programs 710 that are executable by the processor 702 to implement the mechanism 708. As such, the mechanism 708 can be considered a software-and-hardware mechanism. The mechanism 708 performs the methods that have been described.

The computer-readable data storage medium 704 also stores measured (i.e., past) data points 712, predicted data points 714, and one or more motifs 716. The mechanism 708 generates the predicted data points 714 from the measured data points 712. The mechanism 708 further discovers or determines the motifs 716 within the measured data points 712 and the predicted data points 714. The mechanism 708 displays the measured data points 712, the predicted data points 714, and the motifs 716 on the display device 706, in accordance with the mechanisms that have been described.

We claim:

1. A method combining multivariate time-series prediction with motif pattern discovery, comprising:
    performing multivariate time-series prediction, by a processor, on measured data points to generate predicted data points, comprising smoothing the measured data points by at least reducing the measured data points to a plurality of significant data points that correspond to peaks and troughs within the measured data points;
    discovering one or more motifs within the measured data points and the predicted data points, by the processor, including associating the motifs within the measured data points with the motifs within the predicted data points to permit inferences of the motifs within the measured data points to be applied to the motifs within the predicted data points, each motif corresponding to a frequently occurring pattern within the measured data points or the predicted data points; and
    displaying on a display device the measured data points, the predicted data points, and the motifs within the measured data points and the predicted data points, by the processor, and permitting user interaction with display of the measured data points, the predicted data points, and the motifs,
    wherein displaying the measured data points, the predicted data points, and the motifs comprises displaying each motif so that a height of the motif is inversely proportional to a duration of the motif.

2. The method of claim 1, wherein smoothing the measured data points comprises smoothing the measured data points based on moving averages within the measured data points and using a varying time interval to generate the smoothed measured data points,
    and wherein performing the multivariate time-series prediction on the measured data points to generate the predicted data points further comprises:
    generating the predicted data points from the smoothed measured data points.

3. The method of claim 2, wherein generating the predicted data points from the smoothed measured data points comprises, for a time of interest:
    grouping the smoothed measured data points for the time of interest; and
    determining one of the predicted data points for the time of interest based on the smoothed measured data points that have been grouped for the time of interest.

4. The method of claim 3, wherein determining the one of the predicted data points comprises determining the one of the predicted data points as a summation of the smoothed measured data points that have been grouped for the time of interest, as weighted by time distance and significant data point importance.

5. The method of claim 3, wherein generating the predicted data points from the smoothed measured data points further comprises, for the time of interest:
    determining a certainty band for the one of the predicted data points for the time of interest.

6. The method of claim 1, wherein discovering the motifs within the measured data points and the predicted data points comprises:
    clustering the measured data points and the predicted data points into clusters;
    encoding a plurality of events from the clusters; and
    mining the measured data points and the predicted data points based on the events encoded from the clusters to discover the motifs.

7. The method of claim 6, wherein discovering the motifs within the measured data points and the predicted data points further comprises:
    characterizing a performance of each motif to associate each motif to a performance characteristic of the motif, the performance characteristic of each motif measurable on a common scale.

8. The method of claim 7, wherein characterizing the performance of each motif to associate each motif to a performance characteristic of the motif comprises classifying the performance of each motif.

9. The method of claim 8, wherein displaying the measured data points, the predicted data points, and the motifs comprises displaying different performance characteristics in different manners to provide user assistance in determining whether the motifs within the predicted data points are of high or low performance.

10. The method of claim 8, wherein classifying the performance of each motif comprises classifying an efficiency of each motif.

11. The method of claim 1, wherein displaying the measured data points, the predicted data points, and the motifs comprises:
    translating the motifs to a time series encompassing the measured data points and the predicted data points;
    displaying the measured data points and the predicted data points over the time series; and
    displaying each motif on the measured data points and the predicted data points over the time series, in a manner corresponding to a performance characteristic of the motif on the common scale.

12. The method of claim 11, wherein displaying each motif comprises displaying each motif so that a height of the motif is inversely proportional to a duration of the motif.

13. The method of claim 1, wherein smoothing the measured data points generates smoothed measured data points,
    and wherein at least one of the predicted data points is generated based on the smoothed measured data points within a time of interest, as weighted by one or more of time distance and significant data point importance.

14. A non-transitory computer-readable data storage medium storing a computer program executable by a processor to perform a method comprising:
    performing multivariate time-series prediction on measured data points to determine predicted data points, comprising:
        smoothing the measured data points based on moving averages within the measured data points and using a varying time interval to generate smoothed measured data points;
        generating the predicted data points from the smoothed measured data points by grouping the smoothed measured data points for a time of interest and determining one of the predicted data points for the time of interest based on the smoothed measured data points that have been grouped for the time of interest as weighted by time distance and significant data point importance;
    discovering one or more motifs within the measured data points and the predicted data points, each motif corresponding to a frequently occurring pattern within the measured data points or the predicted data points; and displaying on a display device the measured data points, the predicted data points, and the motifs within the measured data points and the predicted data points.

15. A system comprising:
a processor;
a computer-readable data storage medium to store measured data points and predicted data points that have been generated from the measured data points;
a computer program stored on the computer-readable data storage medium and executable by the processor to:
  generate the predicted data points from the measured data points via multivariate time-series prediction;
  determine one or more motifs within the measured data points and the predicted data points via one or more of clustering, event encoding, and data point mining, each motif corresponding to a frequently occurring pattern within the measured data points or the predicted data points; and,
  display on a display device the measured data points, the predicted data points, and the motifs within the measured data points and the predicted data points, by:
    translating the motifs to a time series encompassing the measured data points and the predicted data points;
    displaying the measured data points and the predicted data points over the time series; and
    displaying each motif on the measured data points and the predicted data points over the time series, in a manner corresponding to a performance characteristic of the motif on the common scale, where each motif is displayed to have a height and a duration, the height inversely proportional to the duration.

* * * * *